United States Patent
Takei

(10) Patent No.: US 8,334,619 B2
(45) Date of Patent: Dec. 18, 2012

(54) FREQUENCY VARIABLE POWER TRANSMITTER AND RECEIVER IN FRESNEL REGION AND POWER TRANSMITTING SYSTEM

(75) Inventor: Ken Takei, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 382 days.

(21) Appl. No.: 12/597,574

(22) PCT Filed: Oct. 29, 2008

(86) PCT No.: PCT/JP2008/069625
§ 371 (c)(1),
(2), (4) Date: Oct. 26, 2009

(87) PCT Pub. No.: WO2010/050008
PCT Pub. Date: May 6, 2010

(65) Prior Publication Data
US 2011/0140537 A1    Jun. 16, 2011

(51) Int. Cl.
*H01F 37/00* (2006.01)
(52) U.S. Cl. ........ 307/104; 307/149; 307/151; 320/108; 340/10.1; 455/85
(58) Field of Classification Search ................ 307/104, 307/149, 151; 320/108; 340/10.1; 455/85
See application file for complete search history.

(56) References Cited

U.S. PATENT DOCUMENTS

| | | | | |
|---|---|---|---|---|
| 4,554,672 A | * | 11/1985 | Masamura et al. | 375/267 |
| 5,519,262 A | * | 5/1996 | Wood | 307/104 |
| 5,768,692 A | * | 6/1998 | Kwak | 455/83 |
| 6,862,436 B2 | * | 3/2005 | Hayakawa et al. | 455/121 |
| 7,176,828 B2 | * | 2/2007 | Tirkel et al. | 342/22 |
| 7,277,681 B2 | * | 10/2007 | Saito | 455/108 |
| 8,018,380 B2 | * | 9/2011 | Oh et al. | 342/360 |
| 2004/0001453 A1 | * | 1/2004 | Kawai et al. | 370/311 |
| 2004/0235428 A1 | * | 11/2004 | Nagai et al. | 455/85 |
| 2005/0159187 A1 | * | 7/2005 | Mendolia et al. | 455/562.1 |
| 2007/0072567 A1 | * | 3/2007 | Nagai et al. | 455/205 |
| 2007/0081585 A1 | * | 4/2007 | Suematsu et al. | 375/239 |
| 2007/0096880 A1 | * | 5/2007 | Nagai | 340/10.41 |
| 2008/0055303 A1 | | 3/2008 | Ikeda | |
| 2008/0258984 A1 | * | 10/2008 | Adachi et al. | 343/745 |

FOREIGN PATENT DOCUMENTS

| | | |
|---|---|---|
| JP | 2008-83679 A | 4/2008 |
| JP | 2008-154198 A | 7/2008 |
| JP | 2008-154267 A | 7/2008 |

OTHER PUBLICATIONS

K. Finkenzeller, RFID Handbook, Second Edition, translated by Software Engineering Institute, The Nikkan Kogyo Shimbun, Ltd., May 2004, pp. 27-54.

* cited by examiner

*Primary Examiner* — Jared Fureman
*Assistant Examiner* — Alfonso Perez Borroto
(74) *Attorney, Agent, or Firm* — Mattingly & Malur, PC

(57) ABSTRACT

An object is to achieve a radio power transmitting system capable of adaptively controlling power transmission efficiency, and the following means for achieving it is proposed. The power transmitting system includes a receiver having a loaded antenna and a transmitter whose transmitting frequency is variable, and it controls power transmission efficiency by using a modulated electromagnetic wave reflected from the receiver. A capacitive element and an inductive element are formed in the antenna, the transmitting frequency of the transmitter is set to be variable, the electromagnetic wave transmitted from the transmitter and reflected by the receiver is modulated, and the power transmission efficiency between the transmitter and the receiver is controlled by using the modulated reflection wave.

17 Claims, 16 Drawing Sheets

TRANSMITTER ANTENNA

RECEIVER ANTENNA

ID OF THE INVENTION

The present invention relates to a system and an apparatus which transmit power by using electromagnetic waves and to a transmitting method thereof. More particularly, it relates to a power transmitting system, a power transmitting apparatus, and a power transmitting method suitable for power transmission in the Fresnel region in which static field and inductive field play a main role in energy interactions of electromagnetic field compared with radiation field.

BACKGROUND OF THE INVENTION

Conventionally, as a technique for the case in which the power to be transmitted in power transmission by radio is small, there has been a technique referred to as so-called "passive RFID" in which, by using the radiation field of electromagnetic waves radiated from a transmitter, a receiver captures the electromagnetic field, converts it to alternating current, and rectifies the current, so that the power that can be used as a power supply is obtained (for example, see Non-Patent Document 1).
Non-Patent Document 1: RFID Handbook Second Edition (written by Klaus Finkenzellar, translated by Software Engineering Institute, published by The Nikkan Kogyo Shimbun, Ltd., May 2004)

SUMMARY OF THE INVENTION

Problems to be Solved by the Invention

Along with the development of radio techniques, it has been possible to transmit a large amount of information by radio on electromagnetic waves. Accordingly, in information apparatuses, wires serving as transmitting/receiving media of information have been eliminated as many as possible, so that deterioration of convenience caused by wiring has been overcome. However, the mainstream of the power supply for operating the information apparatus is still the wire, and many information apparatuses have not reached a state of practically no limitation in installation and movement free from wired connections.

Some power transmissions performed by radio have already been put into practical use in the case in which the power to be transmitted is small. A typical one of the power transmission is referred to as "passive RFID" in which, by using the radiation field of the electromagnetic waves radiated from a transmitter, a receiver captures the electromagnetic field, converts it to alternating current, and rectifies the current, so that the power that can be used as a power supply is obtained. This technique is described in the above-mentioned Non-Patent Document 1. The power used by the receiver of RFID is currently about several microwatts, and this is incomparably small compared with the power of several watts to several tens of watts order that is required to operate a general consumer device.

The energy distribution of the electromagnetic field radiated from the transmitter to space is configured with three fields of static field, induction field, and radiation field depending on the way of attenuation in accordance with a distance from the radiation point, and the fields are attenuated by the third power of the distance, the second power thereof, and the first power thereof, respectively. The energy amounts of the respective fields in the extreme vicinity of the radiation point of the power are incomparably decreased in the order of the static field, the induction field, and the radiation field. The electromagnetic field related to radio power transmission used in RFID of conventional techniques is mainly the radiation field or the induction field, and the power transmission of several watts to several tens of watts order that enables operation of a consumer device has not been achieved yet. If a transmitter and a receiver are physically contacted with each other although they are not electrically contacted, or if they are extremely close to each other, the power transmission of several watts can be carried out by the static field. However, since power is not remotely transmitted in practical use, this is insufficient for the improvement of the convenience of installation and movement of an information apparatus achieved by transmitting the power by radio. For example, when actual usage modes of information apparatuses including image devices in households or offices are considered, the power transmission by remote access having a distance within and without one meter, which replaces a wired power line, is required.

An object of the present invention is to achieve the practical remote radio power transmission, by which wired power lines of conventional techniques can be eliminated, by using all fields of the static field, the induction field, and the radiation field that the electromagnetic field has.

Means for Solving the Problems

A typical example of the present invention will be described as follows. That is, a frequency variable power transmitting system in Fresnel region of the present invention is characterized in that a capacitive element and an inductive element are formed in an antenna for transmitting power by electromagnetic wave between a transmitter and a receiver in order to use static field and induction field at the same time in power transmission, a transmitting frequency of the transmitter is set to be variable, the electromagnetic wave transmitted from the transmitter and reflected by the receiver is modulated, and power transmission efficiency between the transmitter and the receiver is controlled by using the modulated reflection wave.

Also, a frequency variable power transmitter in Fresnel region of the present invention is used in the above-mentioned frequency variable power transmitting system in Fresnel region of the present invention and comprises: an antenna; a frequency variable carrier generator; a directional coupler; a demodulator; and a control circuit, wherein a reflection wave received by the antenna is divided by the directional coupler, and then, the reflection wave is demodulated by the demodulator, and the frequency of the frequency variable carrier generator can be varied by using the demodulated signal.

Further, a frequency variable power receiver in Fresnel region of the present invention is used in the above-mentioned frequency variable power transmitting system in Fresnel region of the present invention and comprises: an antenna; a switching element inserted in parallel to the antenna; a control circuit; a memory; and a rectifying circuit, wherein the control circuit turns on/off the switching element at a constant timing previously memorized in the memory.

Effects of the Invention

According to the radio power transmitting system operated in Fresnel region, which is one aspect of the present invention, all of the static field, the induction field, and the radiation field generated in space when the power transmission by electromagnetic waves is carried out are used, and therefore, a more efficient power transmission than that of the radio system focused on a single field, which is a conventional technique, becomes possible.

BRIEF DESCRIPTIONS OF THE DRAWINGS

DESCRIPTION OF SYMBOLS

Figure 1:
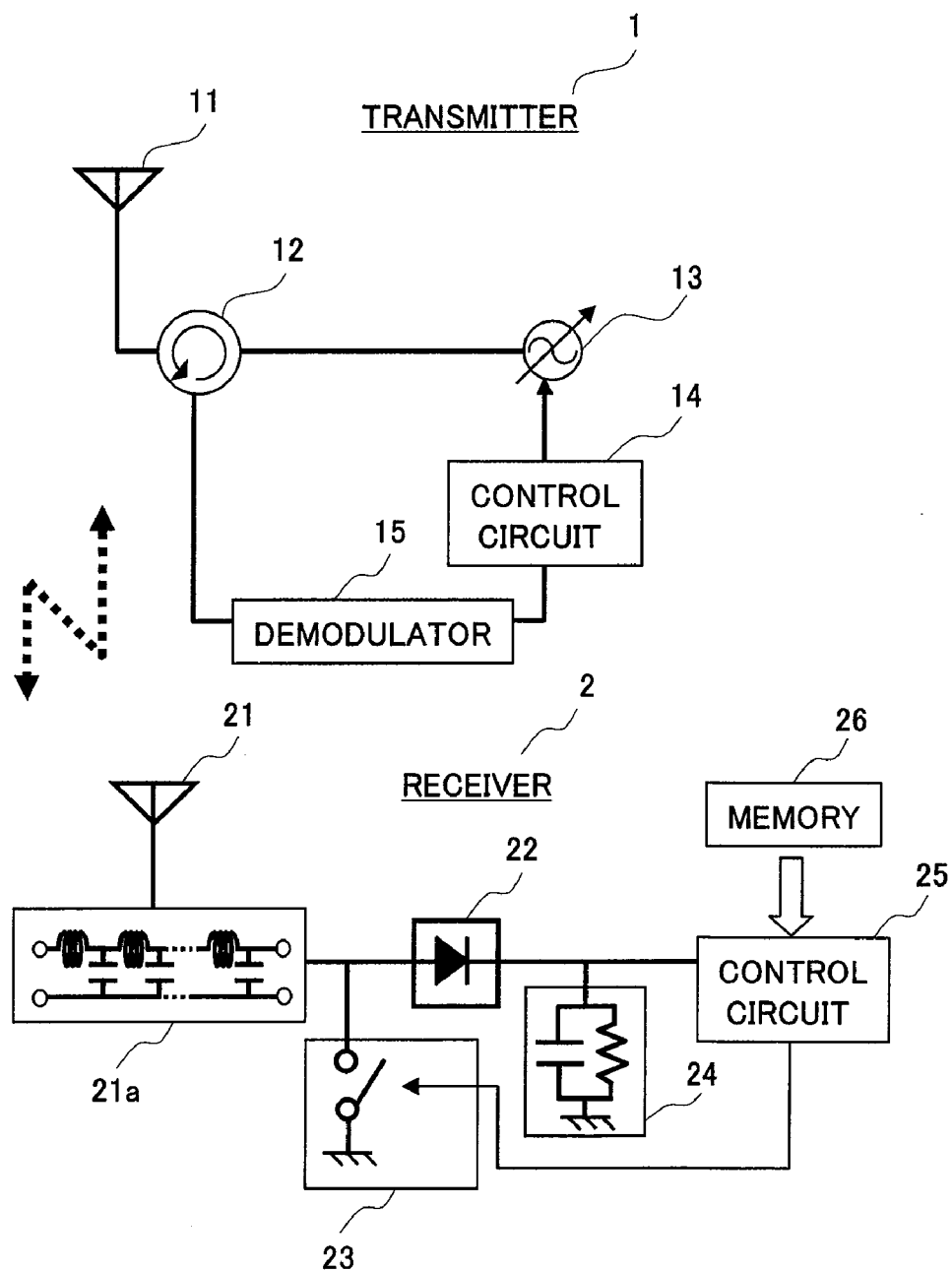
FIG. 1 is a diagram illustrating a first configuration example of a frequency variable power transmitting system in Fresnel region of the present invention.

1 TRANSMITTER
2 RECEIVER
10 TRANSMITTER
11 ANTENNA
12 DIRECTIONAL COUPLER
13 FREQUENCY VARIABLE CARRIER GENERATOR
14 CONTROL CIRCUIT
15 DEMODULATOR
16 MODULATOR
17 ARITHMETIC CIRCUIT
18 MIXER
19 FILTER
20 RECEIVER
21 ANTENNA
22 RECTIFYING CIRCUIT
23 SWITCHING CIRCUIT
24 SMOOTHING CIRCUIT
25 CONTROL CIRCUIT
26 MEMORY
27 DEMODULATOR
28 ARITHMETIC CIRCUIT
29 COUPLER
33 FREQUENCY VARIABLE CARRIER GENERATOR
34 CONTROL CIRCUIT
40 RECEIVER
41 ANTENNA
42 RECTIFYING CIRCUIT
43 SWITCHING CIRCUIT
44 SMOOTHING CIRCUIT
45 CONTROL CIRCUIT
46 MEMORY
53 FREQUENCY VARIABLE CARRIER GENERATOR
54 CONTROL CIRCUIT
60 RECEIVER
61 ANTENNA
62 RECTIFYING CIRCUIT
63 SWITCHING CIRCUIT
64 SMOOTHING CIRCUIT
65 CONTROL CIRCUIT
66 MEMORY
70 COMBINING CIRCUIT
81 SWITCH
82 CPU
100 ANTENNA
101 RECTANGULAR CONDUCTOR
102 REACTANCE ELEMENT
103 DIODE
104 SMOOTHING CIRCUIT
105 COMBINING LINE
106 LOAD CIRCUIT
116 TEMPORARY MEMORY
219 FILTER
336 TEMPORARY MEMORY
556 TEMPORARY MEMORY

DETAILED DESCRIPTION OF THE PREFERRED EMBODIMENTS

In order to efficiently carry out the power transmission by using the electromagnetic field, it is particularly important to use a region having high capability of remote transmission by the electromagnetic field and to utilize all three components of the static field, the induction field, and the radiation field that the electromagnetic field has. The radio transmission characteristics of the electromagnetic field are a function of a distance normalized by a wavelength, and therefore, in a distance not practically reducing the convenience, there should be provided a frequency at which the static field and the induction field having high capability of the remote transmission have high energy densities with respect to the radiation field as much as possible. Since the static field is attenuated by the third power of the distance, the energy transmitting method using the electromagnetic field in which only the static field mainly works is inadvisable to expand the distance between the transmitter and the receiver. Therefore, a mode in which both of the static field and the induction field mainly carry out the energy transmission by the electric field is most preferable in order to solve the problems of the present invention.

Transmission by a capacitor is effective for the static field, and transmission by a transformer is effective for the induction field. This indicates that a capacitive element is preferable for the energy transmission in the former one and an inductive element is preferable for the energy transmission in the latter one. Therefore, in the energy transmission mainly using both of the static field and the induction field, which is the object of the present invention, it is considered that an equivalent circuit network formed of the capacitive element and the inductive element contributes to high-efficient transmission of energy. Such an equivalent circuit network includes a resonant circuit formed by the inductive element and the capacitive element, and therefore, at a resonance point of the resonant circuit, the reactance component of the equivalent circuit network is local minimum, and the energy accumulated in space is local minimum, so that local maximum energy transmission from the transmitter to the receiver is achieved.

In such a local maximum energy transmission state, high-efficient power transmission by radio is possible. However, since the resonance phenomenon is used as a result, the energy transmission state, i.e., the radio power transmission efficiency is largely affected by variation of the element values of the equivalent circuit network. The equivalent circuit network is formed in the space including the transmitter and the receiver, and therefore, each value of the elements forming the equivalent circuit network is affected by variation of the electrical environment in the periphery of the transmitter and in the periphery of the receiver, and the variation of the radio power transmission efficiency with respect to the variation of the electrical environment is quadratic due to the property of the resonant circuit to be a function of the multiplication of the inductive element and the capacitive element. This is largely different in property from the linear transmission efficiency variation of the energy transmitting system by the electromagnetic field in which the static field or the induction field is singularly used, and this means that, although there is a possibility capable of increasing the radio power transmission efficiency in essence, its stability is low.

One of main objects of the power transmission by radio is to improve the convenience in installation and movement of an information apparatus, and therefore, such deterioration of the stability of the radio power transmission efficiency is a problem to be solved. The equivalent circuit network formed in the space including the transmitter and the receiver can be expressed by an impedance function, and therefore, the reactance value of the circuit network is a function of a frequency. Therefore, by varying the frequency of the electromagnetic field that reaches the receiver from the transmitter, a value of reactance constituting the equivalent circuit network can be varied. To vary the frequency of the transmitter means that the frequency of the electromagnetic field radiated from the transmitter to the space widely expands. Generally, since many radio systems that use the electromagnetic field are present, the number of types of the frequencies used for the power transmission by radio is desired to be as small as possible, and thus, the width of the frequency varied by the transmitter is also desired to be narrow. Therefore, the value of the reactance forming the equivalent circuit network is desired to be largely varied along with the variation of the frequency. This means that a Q-value of the reactance is high, and there is a possibility that it can be achieved by providing a high-Q capacitor and a high-Q inductor in the space including the transmitter and the receiver. It is an antenna that plays a role of converting the energy of electromagnetic waves between the receiver or transmitter and the space, and the electric characteristics in the frequency region in which the antenna is used are required to be similar to a circuit operation that includes the high-Q capacitor and the high-Q inductor. Such an antenna can be found by dividing a predetermined two-dimensional area into small rectangular areas, and in a combination whether a conductor exists in the small rectangular area or not and a combination in which the high-Q capacitor or the high-Q inductor is connected between a pair of the small rectangular conductors adjacent to each other, searching the combination one by one for all the combinations and obtaining an appropriate element value of the high-Q capacitor or the high-Q inductor by a local optimizing method.

In this manner, while the radio power transmission efficiency corresponding to the variation of the electrical environment of the space including the transmitter and the receiver can be controlled to an optimal state by employing the antenna as an antenna of the receiver and varying the transmitting frequency of the transmitter, the control can be achieved in real time when a reference signal for varying the frequency of the transmitter can be obtained, and as a result, adaptive control of the radio power transmission efficiency becomes possible. In order to solve this problem, a switching element is inserted in parallel to the antenna of the receiver, and the switching element is turned on/off at a predetermined timing. By this operation, the antenna can alternately switch binary load impedance, and therefore, the reflection coefficient with respect to the outside electromagnetic field of the antenna is varied, and as a result, amplitude modulation is performed to the reflection wave that reaches the transmitter, so that a side band having a different frequency from the transmitting frequency of the transmitter is generated therein. Although a component of the electromagnetic field that is radiated from the transmitter and reflected by the receiver is weak, the component can be easily detected by conventional techniques because the side band and the transmitting frequency have different frequencies. As one of such conventional techniques, there is a discrimination method of the receiver reflection wave of RFID using back scattering, and details thereof are described in the above-mentioned Non-Patent Document 1.

When the usage modes of consumer information apparatuses of conventional techniques are taken into consideration, it is considered that a plurality of receivers are so-called multiple-accessed to one transmitter for the radio power transmission. For such a requirement, it is considered that a transmitter assigns different frequencies to different receivers. This is an analogy of a method of frequency division multiple access which is generally carried out in the field of radio communication. However, in the radio power transmission according to the present invention, the variation of the frequency of the electromagnetic wave transmitted by the transmitter cannot be previously expected, and therefore, it is required to discriminate different receiving stations. For this problem, by varying, in each receiver, the load impedance of the antenna with respect to the electromagnetic waves transmitted from the transmitter, the modulation to be carried out is varied. Specifically, a method of using a unique modulation frequency or modulation period in each receiver and a method of attaching some information such as a unique ID of the receiver on the modulation signal itself are conceivable.

In the radio power transmitting system of the present invention, in order to carry out optimum control depending on the adaptive type of the radio power transmission efficiency, control information is transmitted to a radio line formed by the transmitter and the receiver. This means that the radio power transmitting system of the present invention forms the line that enables information transmission. By utilizing the characteristics, it is possible to realize the so-called "compatible transmission of power and information" in which not only power but information is transmitted by mounting a modulator on the transmitter to superimpose some information on the transmitted electromagnetic waves. In order to realize the radio power transmission which is highly convenient in practice by using the Fresnel region, the wavelength of the used electromagnetic wave has to be lengthened. When the radio power transmission of 1 meter is assumed as an example, the frequency is 33 MHz on assumption of a wavelength of about one tenth of a wavelength region in which the induction field and the static field can be utilized, and "compatible transmission of power and information" at a transmitting rate of several Mbps can be achieved when normal AM modulation is assumed. In this case, since the adaptive transmission efficiency control of the radio power transmission has to be carried out at the same time, the modulation frequency of the transmitter has to be sufficiently apart by a certain degree so that the modulation frequency can be discriminated from the frequency of the side band used for the same adaptive control. The signal for normal control is not required to have a large amount of information, and therefore, the transmitting rate of the signal superimposed on the electromagnetic wave transmitted by the transmitter is required to be larger than the transmitting rate of the signal superimposed on the reflection wave of the electromagnetic wave by the receiver.

The power obtained from the antenna by using the techniques of the present invention is AC power of a high frequency, and in order to use this power as a power supply, the power has to be converted to DC power by rectification. While a frequency band used in the Fresnel region is several tens of MHz, the required power is in several watt order. The semiconductor device that converts AC power to DC power is a diode, and the operation frequency and breakdown voltage of the diode are inversely proportional to each other in general. This is because, although the diode operated with low loss and in a high frequency region can be achieved by the structural refinement, a reverse breakdown voltage is reduced due to the structural refinement. Therefore, a plurality of diodes have to be used as the diodes to be mounted on the receiver in order to obtain large power. The power after the rectification is DC power, and in its combining, combining loss related to mismatching of phases specific in high frequency and transmission loss related to ohm loss of a power combining line are not essentially required to be taken into consideration. Therefore, a rectifying circuit and a smoothing circuit made up of a diode, a capacitor, and a load resistor are distributively allocated at a plurality of locations of the antenna, and the DC power which is the output of each smoothing circuit is combined by a connecting line formed of a conductor different from a conductor constituting the antenna, so that high rectifying efficiency can be achieved. At this time, the connecting line is allocated along a backside of the small conductor constituting the antenna so as not to affect the antenna characteristics.

Hereinafter, embodiments of the present invention will be explained in detail with reference to drawings.

First Embodiment

FIG. 1 is a diagram illustrating a configuration of an embodiment of a frequency variable power transmitting system in Fresnel region according to the present invention. The system includes: a transmitter 1 in which a directional coupler 12 is connected to a first antenna 11, a frequency variable carrier generator 13 is connected to the directional coupler 12 in a direction of supplying a signal to the antenna 11, and the frequency variable carrier generator 13 is controlled by a control circuit 14 with using a demodulated signal of a demodulator 15 to which a signal is transmitted from the antenna 11 via the directional coupler 12; and a receiver 2 in which a second antenna 21 loading a group 21a of reactance elements and a rectifying circuit 22 rectifying the output of the second antenna 21 are connected together with a smoothing circuit 24, and a control circuit 25 using the output of the smoothing circuit 24 as a power supply and accompanying a memory 26 controls a switching circuit 23 formed of a switching element inserted in parallel to the second antenna 21.

The output of the frequency variable carrier generator 13 transmitted from the transmitter 1 serves as the input of the second antenna 21 of the receiver 2, is rectified by the rectifying circuit 22, is smoothed by the smoothing circuit 24, and drives the control circuit 25. The control circuit 25 opens/closes the switching circuit 23 in accordance with a time sequence previously written in the memory 26. Since the load impedance of the second antenna 21 is varied by opening/closing the switching circuit 23, the electromagnetic wave reflected by the second antenna 21 is modulated in accordance with the data of the memory 26 and is taken into the transmitter 1 by the first antenna 11, and this information is brought to the control circuit 14 by the demodulator 15 via the directional coupler 12. With using the demodulated information, the control circuit 14 varies a carrier frequency of the frequency variable carrier generator 13 so that the received power of the receiver 2 becomes the maximum.

The directional coupler 12 can be formed by a circulator, a hybrid line, a $\lambda/2$ coupler ($\lambda$: wavelength), etc. depending on the frequency of the electromagnetic wave transmitted by the frequency variable power transmitting system in Fresnel region. The switching circuit 23 can be formed by a transistor, a pin diode, etc.

Since the reactance elements are loaded in the second antenna 21 included in the receiver 2, the self impedance of the antenna is varied in accordance with the variation of the carrier frequency, so that it is possible to adaptively control the matching state between the space in the vicinity of the receiver 2 transmitting the electromagnetic wave transmitted from the transmitter 1 and the rectifying circuit 22 within the receiver 2. When the matching state between both of them is good, the amount of the electromagnetic wave reflected by the second antenna 21 is decreased, and therefore, the on/off ratio of the reflection wave generated by the on/off of the switching circuit 23 is increased, and the degree of the modulation provided to the reflection wave is increased, so that the amplitude of the side band in the reflection wave is increased.

Therefore, when the control circuit 14 of the transmitter 1 controls the carrier frequency of the frequency variable carrier generator 13 so as to maximize the amplitude of the side band, the power transmission from the transmitter 1 to the receiver 2 can be dynamically optimized. In other words, adaptive optimization of the power transmission efficiency can be achieved.

Second Embodiment

Figure 2A:
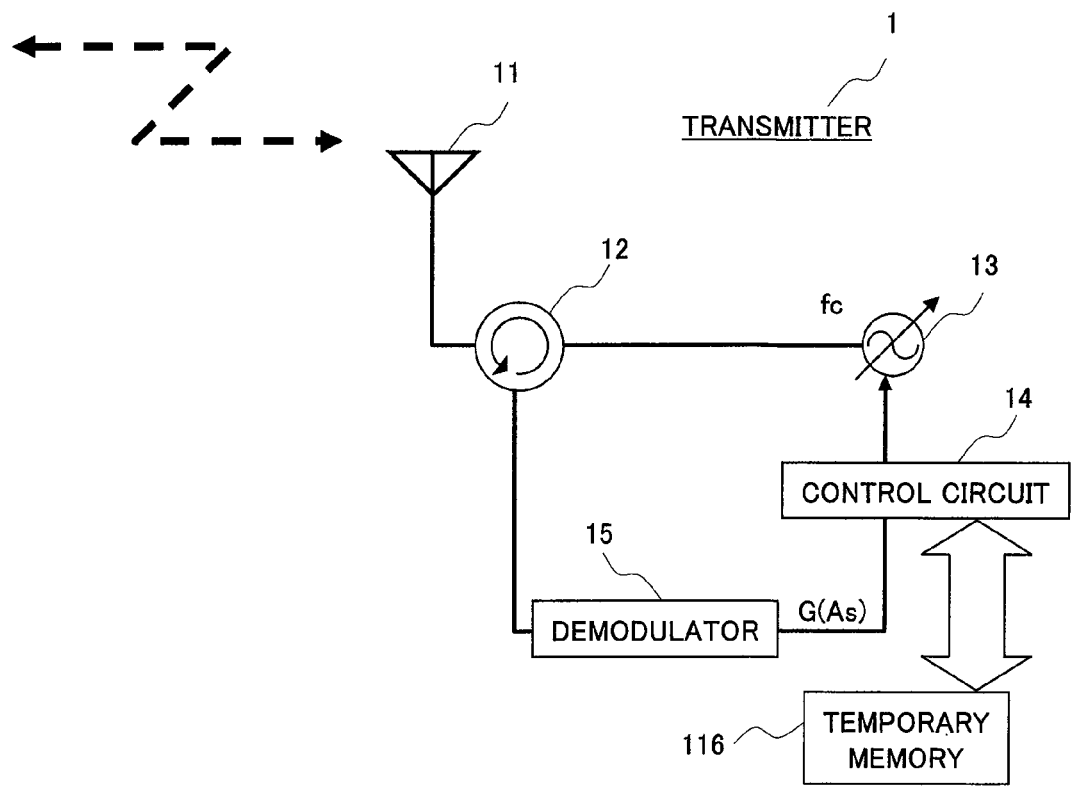
FIG. 2A is a diagram illustrating a first configuration example of a base station for the frequency variable power transmitting system in Fresnel region of the present invention.
Figure 2B:
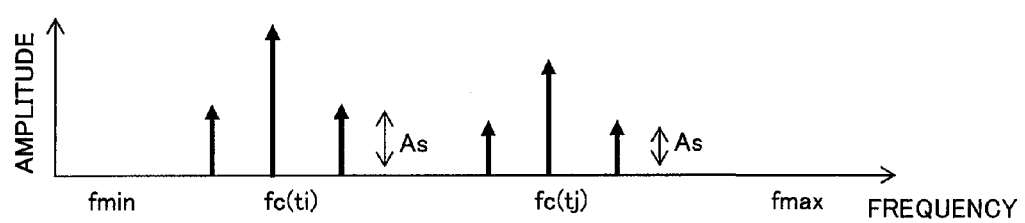
FIG. 2B illustrates a frequency spectrum of the configuration of FIG. 2A.
Figure 2C:
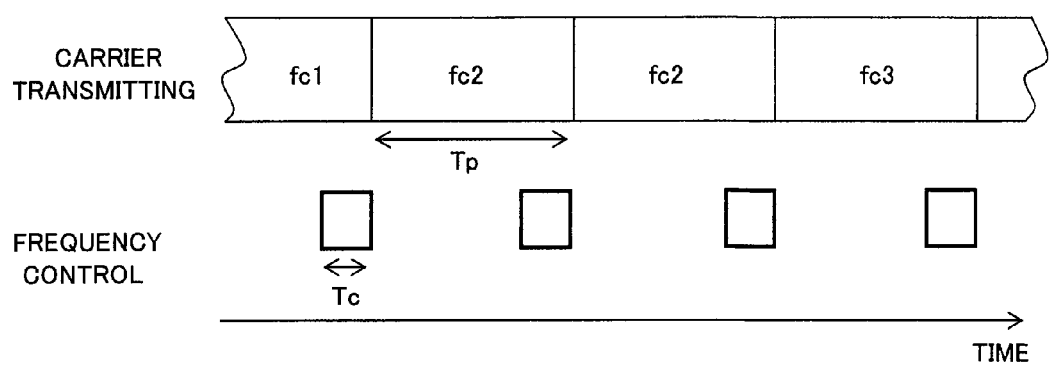
FIG. 2C illustrates a time chart of the configuration of FIG. 2A.

FIGS. 2A, 2B, and 2C are diagrams illustrating another embodiment (FIG. 2A) of the structure of the transmitter used in the power transmitting system in Fresnel region of FIG. 1 which is the embodiment of the frequency variable power transmitting system in Fresnel region according to the present invention, time variation (FIG. 2B) of frequency spectra of a received reflection wave, and a time chart (FIG. 2C) of an operation of the control circuit. A point different from the base station of the embodiment of FIG. 1 is that the control circuit 14 has a temporary memory 116.

The control circuit 14 of the transmitter 1 has an allowable maximum frequency fmax, an allowable minimum frequency fmin, a frequency step Δf, and a center frequency fc0 which are previously determined in the temporary memory 116. First, as initialization, the control circuit 14 sets the carrier frequency of the frequency variable carrier generator 13 to fc0, sets a tentative maximum value of the side band to 0, and sets the value of variation of the frequency in the tentative direction to a positive value. If a larger amplitude is obtained when the amplitude of the side band of the received reflection wave is compared with the tentative maximum value, the carrier frequency of the frequency variable carrier generator 13 is moved forward to the tentative direction of variation of the frequency by the magnitude corresponding to Δf, thereby updating the tentative maximum value, and if a smaller amplitude is obtained, the carrier frequency of the frequency variable carrier generator 13 is moved reverse to the tentative direction of variation of the frequency by the magnitude corresponding to Δf, thereby reversing the tentative direction.

Figure 3:
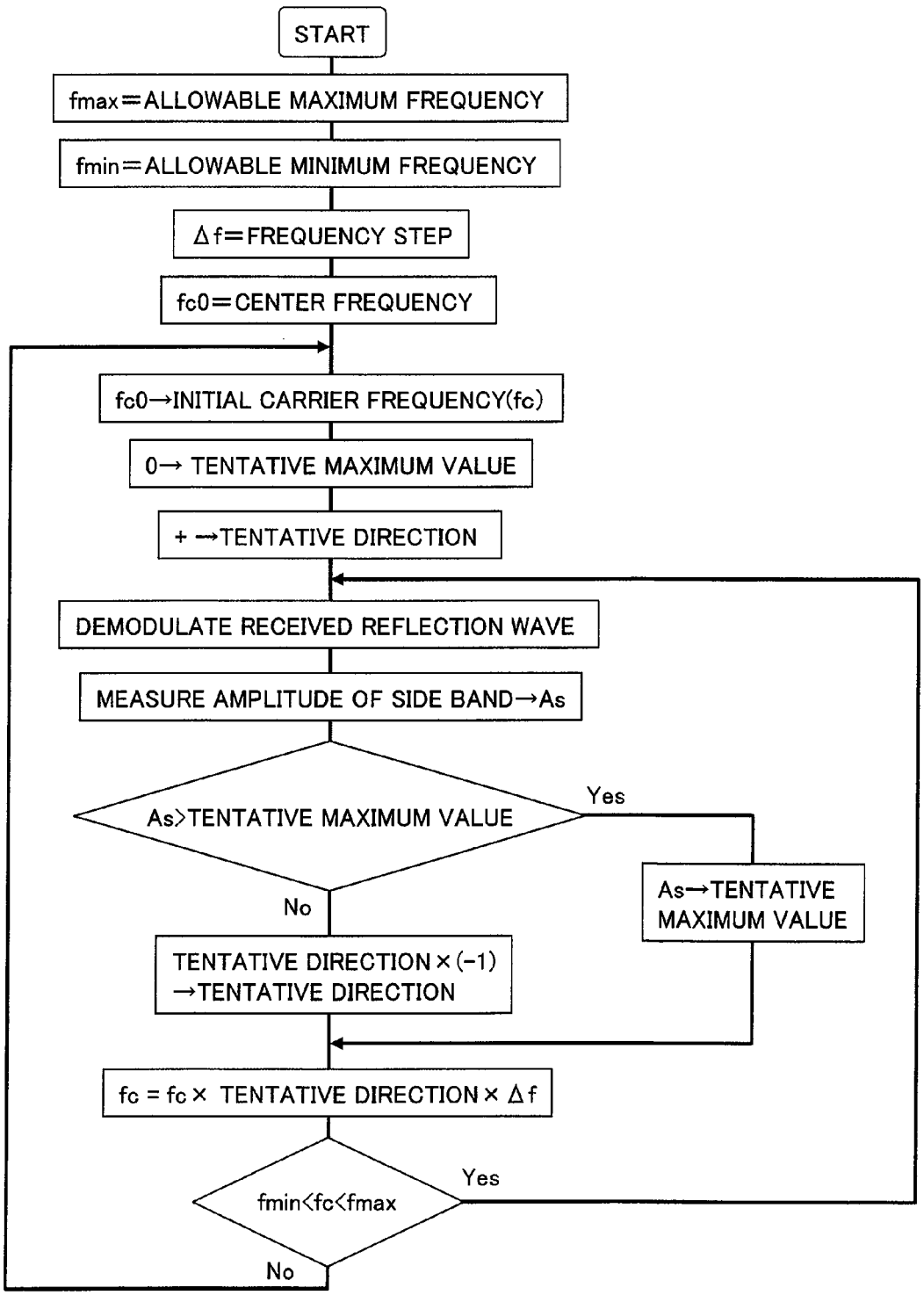
FIG. 3 illustrates an automatic control flow chart of the frequency variable power transmitting system in Fresnel region of the present invention.

During the period when the updated frequency of the frequency variable carrier generator 13 exists between fmax and fmin, this control is repeated, and when the frequency is over fmax or below fmin, the control returns to the original initialization. A flow chart of these controls is illustrated in FIG. 3.

By such a process, on a frequency axis, the frequency spectra of the electromagnetic wave used by the frequency variable power transmitting system in Fresnel region are dynamically varied between fmax and fmin as illustrated in FIG. 2B. In the time chart of the control circuit 14 and the frequency variable carrier generator 13, the control circuit 14 carries out a control procedure of updating the frequency of the frequency variable carrier generator 13 during time Tc in every constant period Tp as illustrated in FIG. 2C. In accordance with a result of the control procedure, the frequency variable carrier generator 13 varies the transmitting frequency after the control procedure is finished. When the frequency to be updated is the same as the previous frequency, the frequency variable carrier generator 13 transmits electromagnetic waves at the same frequency. In an example of FIG. 2C, a second frequency update is not carried out.

According to the present embodiment, adaptive optimization of the power transmitting efficiency can be achieved by a specific control algorithm with using an automatic control technique of a conventional technique.

Third Embodiment

Figure 4:
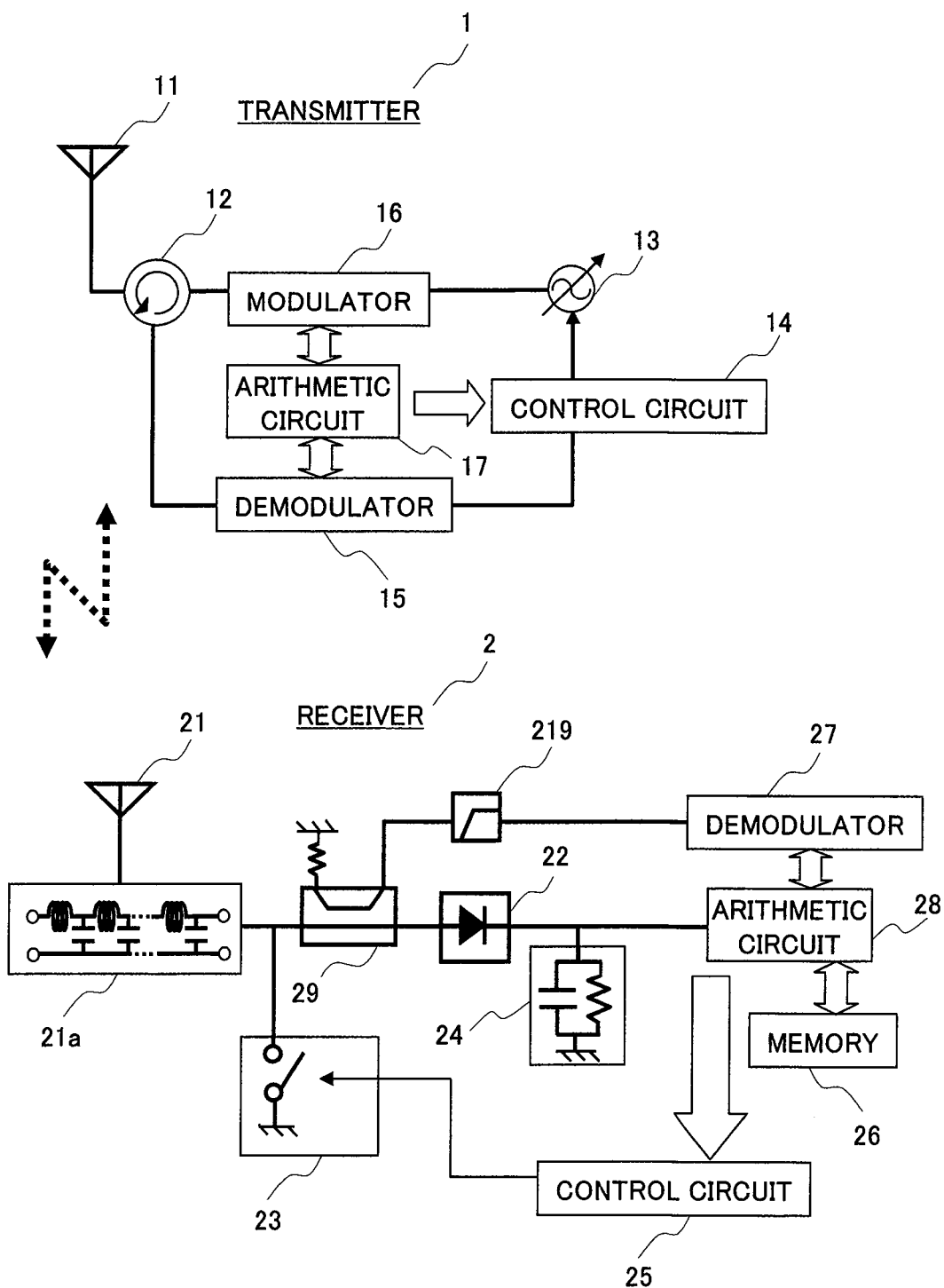
FIG. 4 is a diagram illustrating a second configuration example of the frequency variable power transmitting system in Fresnel region of the present invention.

FIG. 4 is a diagram illustrating a structure of another embodiment of the frequency variable power transmitting system in Fresnel region according to the present invention. The points different from the base station of the embodiment of FIG. 1 are that the transmitter 1 has a modulator 16 and an arithmetic circuit 17 and the receiver 2 has an arithmetic circuit 28, a demodulator 27, a coupler 29, and a filter 219. The modulator 16 is inserted between the directional coupler 12 and the frequency variable carrier generator 13, and the arithmetic circuit 17 carries out centralized control of the control circuit 14, the demodulator 15, and the modulator 16, and the arithmetic circuit 28 controls the control circuit 25 with using the information of the memory 26 and carries out centralized control of the demodulator 27 to which a part of energy of the electromagnetic wave, which is divided by the coupler 29 inserted between the second antenna 21 and the rectifying circuit 22 and is received by the antenna 21, is input via the filter 219. The modulation frequency of the modulator 16 is set to be higher than the switching frequency of the switching circuit 23 by which the receiver 2 modulates the reflection wave from the transmitter 1.

Therefore, by using a high pass filter as the filter 219, the information superimposed by the modulator 16 on the electromagnetic wave transmitted from the transmitter 1 can be demodulated by the demodulator 27 of the receiver 2, and thus, there is an effect of achieving the compatible transmission of power and information by radio.

Fourth Embodiment

Figure 5A:
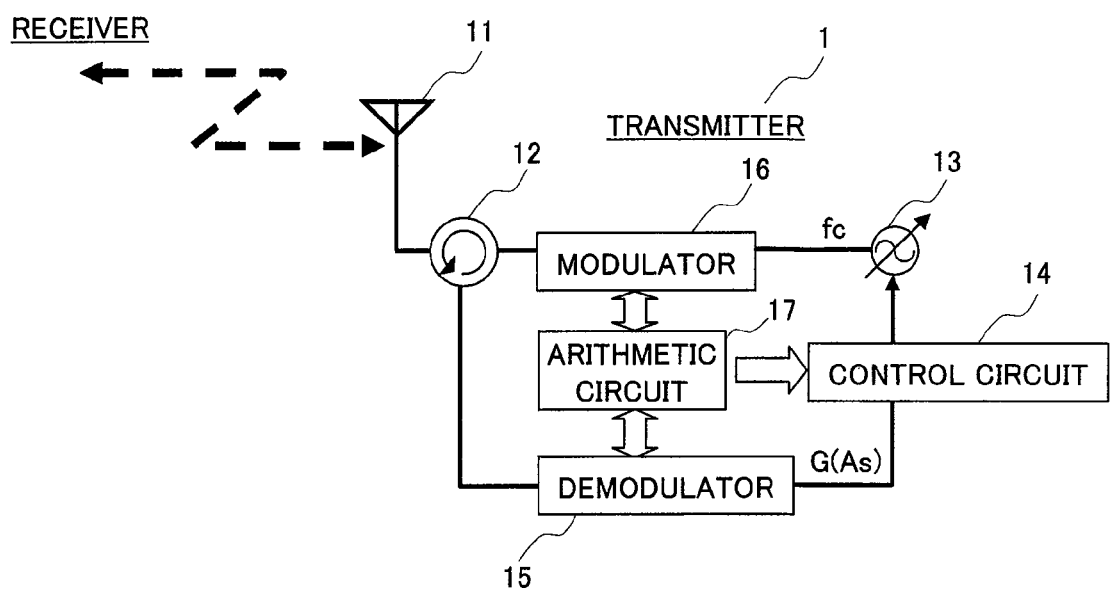
FIG. 5A is a diagram illustrating a second configuration example of the base station for the frequency variable power transmitting system in Fresnel region of the present invention.
Figure 5B:
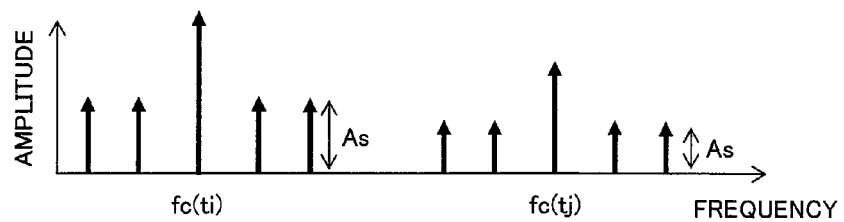
FIG. 5B illustrates a frequency spectrum of the configuration of FIG. 5A.
Figure 5C:
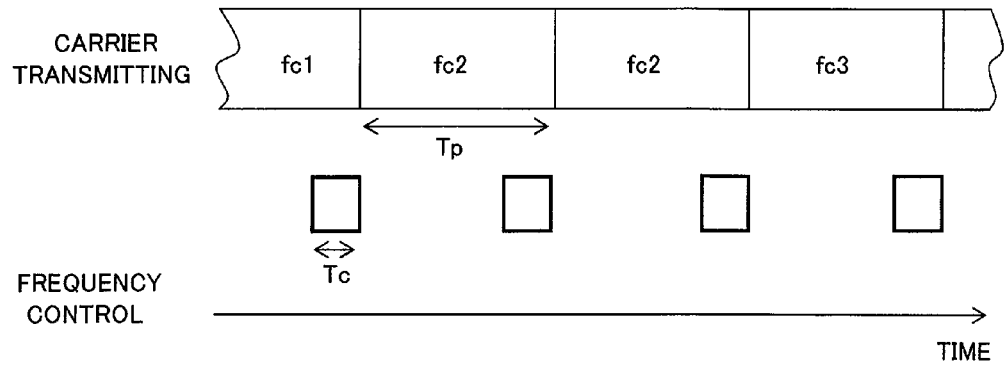
FIG. 5C illustrates a time chart of the configuration of FIG. 5A.

FIGS. 5A, 5B, and 5C are diagrams illustrating a structure (FIG. 5A) of the transmitter of the frequency variable power transmitting system in Fresnel region of FIG. 4 which is another embodiment of the frequency variable power transmitting system in Fresnel region according to the present invention, time variation (FIG. 5B) of the frequency spectra of a received reflection wave, and a time chart (FIG. 5C) of an operation of a control circuit. As illustrated in FIG. 5B, the arithmetic circuit 17 selects a side band having a smaller mistuned frequency of the two types of side bands of the carrier and supplies it to the control circuit 14 as a control signal of the frequency variable carrier generator 13. A control method of the frequency variable carrier generator 13 is the same as that of the embodiment of FIG. 2.

A frequency component of a signal used in the adaptive control of the power transmission efficiency and a frequency uniquely modulated by the transmitter 1 are different from each other, and therefore, there is an effect that the receiver 2 can obtain some information together with the power transmission, and the arithmetic circuit 17 adds the information to the modulation signal of the modulator 16, so that the transmitter 1 can carry out the compatible transmission of power and information by radio.

Fifth Embodiment

Figure 6A:
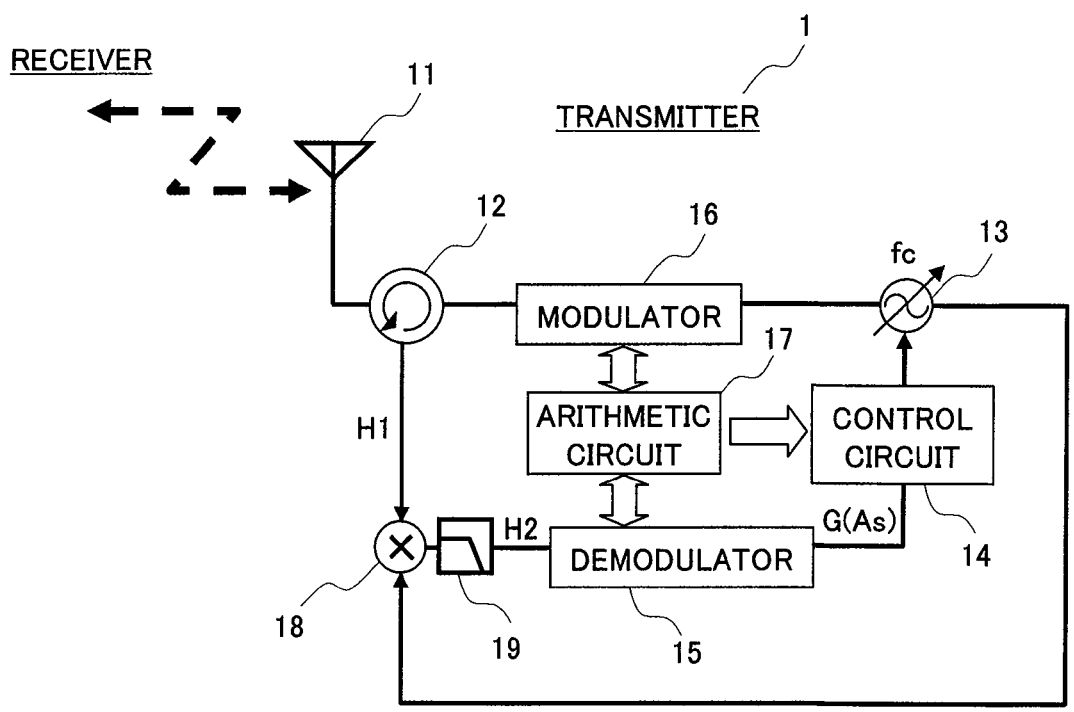
FIG. 6A is a diagram illustrating a third configuration example of the base station for the frequency variable power transmitting system in Fresnel region of the present invention.
Figure 6B:
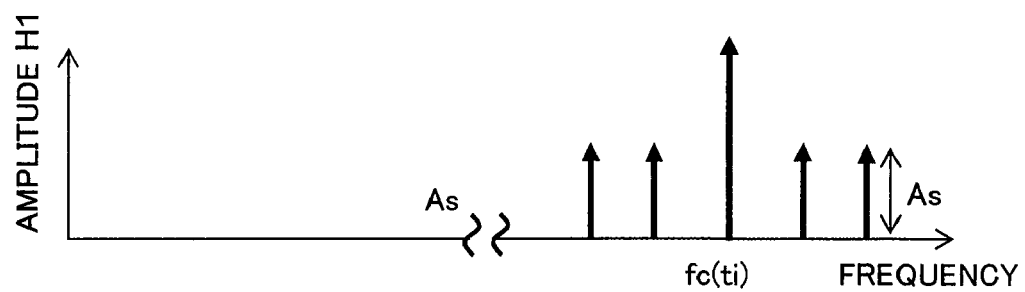
FIG. 6B is a diagram illustrating frequency spectra of the configuration of FIG. 6A and a relation between frequency and amplitude H1.
Figure 6C:
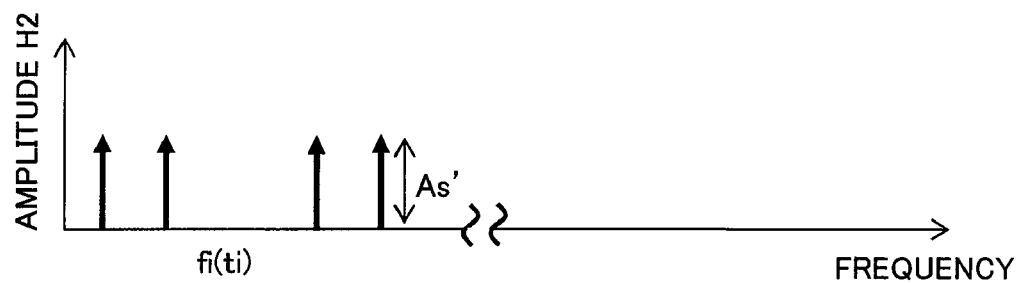
FIG. 6C is a diagram illustrating frequency spectra of the configuration of FIG. 6A and a relation between frequency and amplitude H2.

FIGS. 6A, 6B, and 6C are diagrams illustrating a structure (FIG. 6A) of a transmitter of another embodiment of the frequency variable power transmitting system in Fresnel region according to the present invention, and time variations (FIGS. 6B and 6C) of frequency spectra of received reflection waves. A point different from the base station of the embodiment of FIG. 5 is that the transmitter 1 has a mixer 18 and a filter 19, and the mixer 18 is inserted between the directional coupler 12 and the demodulator 15 via the filter 19. The modulated reflection wave from the receiver 2 which is obtained from the antenna 11 via the directional coupler 12 is input to the mixer 18 as an RF signal, and also a part of the output of the frequency variable carrier generator 13 is input to the mixer 18 as a signal transmitted from the station. The mixer 18 supplies a low frequency signal having a lower frequency component compared with that of the carrier to the demodulator 15 as a signal of the side band. A signal having a high frequency component generated by the mixer 18 can be removed from the input to the demodulator 15 by using a low pass filter as the filter 19. FIGS. 6B and 6C are diagrams illustrating frequency spectra of the high frequency input and the low frequency output of the mixer.

According to the present embodiment, since the demodulator 15 does not have to handle the RF signal, a circuit scale of the demodulator 15 can be downsized. Moreover, since an analog/digital converter of a conventional technique can be used in such a low frequency band, the demodulation process of the demodulator 15 can be carried out by using digital signal processing, and further downsizing of the circuit and improvement of demodulation accuracy can be achieved.

Sixth Embodiment

Figure 7:
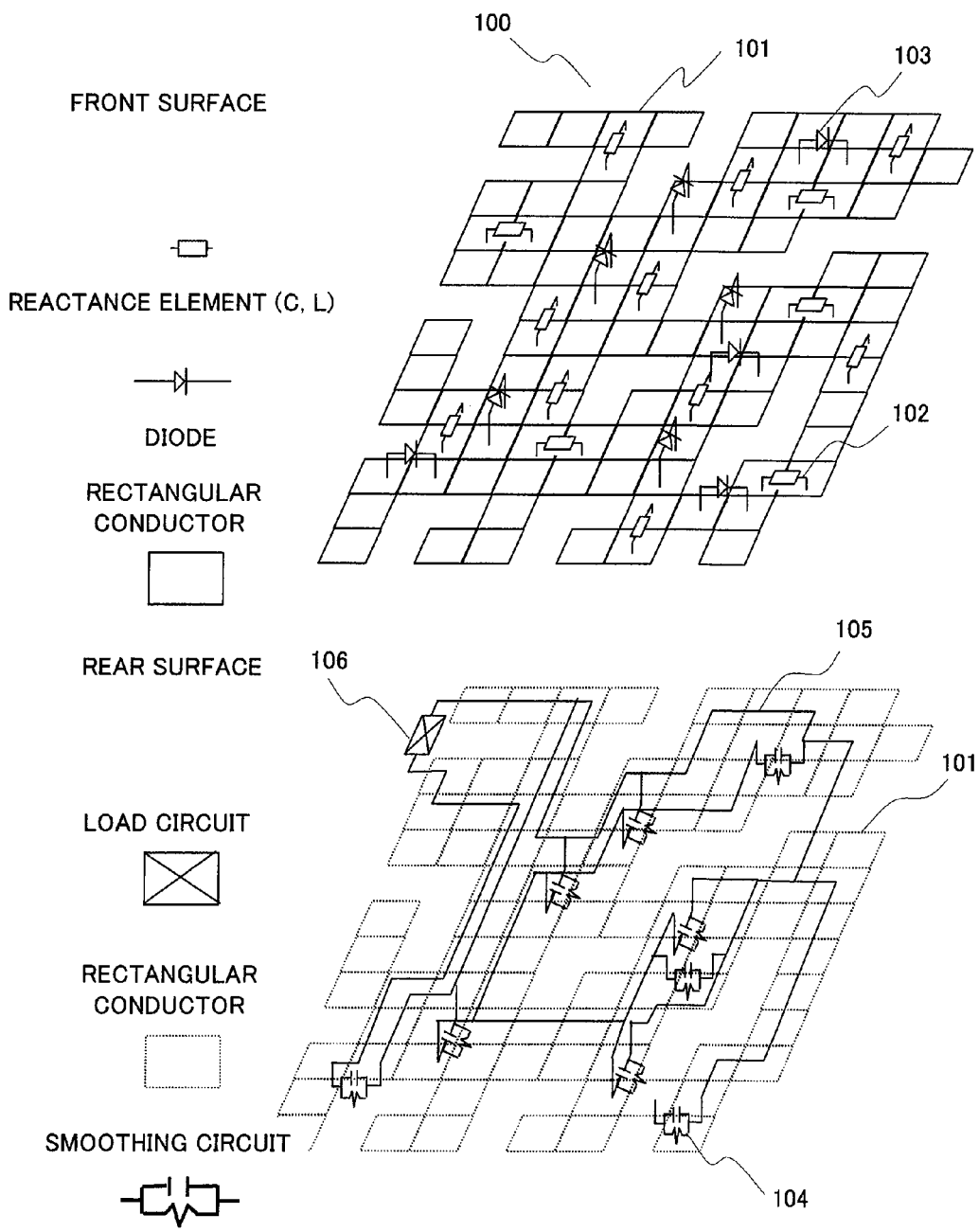
FIG. 7 is a perspective view illustrating a configuration example of an antenna for the frequency variable power transmitting system in Fresnel region of the present invention.

FIG. 7 is a diagram illustrating a structure of an embodiment of the antenna of the receiver used in the frequency variable power transmitting system in Fresnel region according to the present invention. Reactance elements 102 and diodes 103 are distributively loaded in the antenna 100 formed of small rectangular conductors 101. A smoothing circuit 104 is connected to each diode 103 in parallel, the rectification outputs of the diodes 103 are smoothed to be direct currents, and the direct currents are power-combined in a DC region by a combining line 105 to be a power supply of a load circuit 106.

At the locations where the reactance elements 102 and the diodes 103 are loaded, the small rectangular conductors 101 are electrically separated from each other so as to prevent the short circuit of a high frequency current caused by the rectangular conductors 101 in this structure. Since the combining line 105 is allocated so as to be adjacent only to a backside of the small rectangular conductors 101, the characteristics of the antenna formed of the group of the small rectangular conductors 101 are hardly affected. Since the antenna structure includes the reactance elements, the antenna of the present invention can largely vary the self impedance with respect to the variation of frequencies. Therefore, this structure is preferable for the automatic control of the power transmission efficiency using the carrier frequency as a variable parameter in the present invention.

Generally, operation frequency and breakdown voltage are in trade-off relation in semiconductors. In the antenna structure of the present invention, the plurality of diodes are distributively allocated, and the rectification output of each diode is combined in the manner of direct current, and therefore, power applied to each diode can be reduced, and thus, a diode excellent in high frequency characteristics can be used even in a case in which large power is transmitted between a transmitter and a receiver, and as a result, there is the effect of improving the transmission efficiency of power.

Seventh Embodiment

Figure 8:
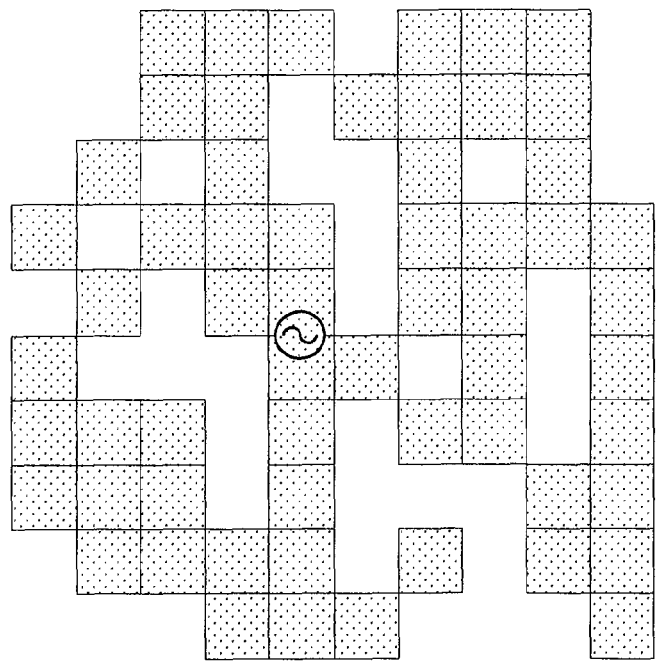
FIG. 8 is a plan view illustrating the configuration example of the antenna for the frequency variable power transmitting system in Fresnel region of the present invention.
Figure 8:
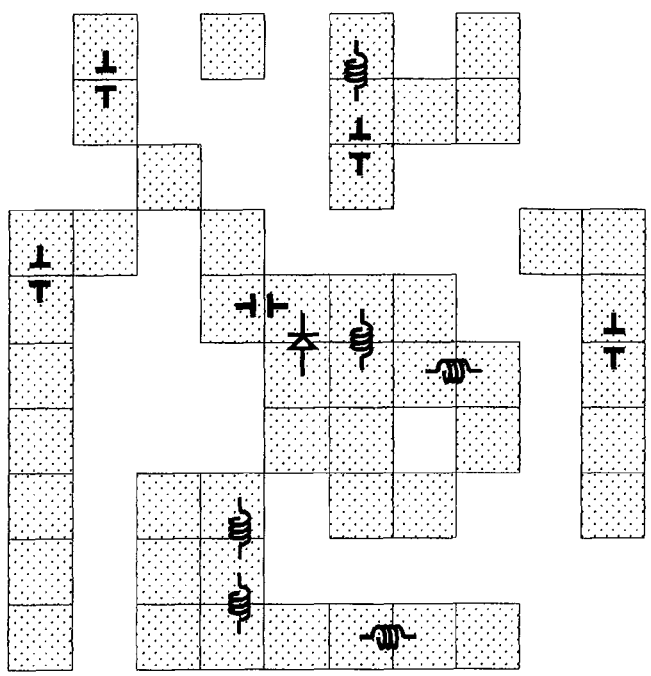

FIG. 8 is a diagram illustrating another structure of the embodiment of the antenna of the receiver used in the frequency variable power transmitting system in Fresnel region according to the present invention, in which a plurality of inductors and capacitors are distributively loaded as reactance elements in a space in which at most 10×10 pieces of small rectangular conductors 101 can be allocated.

Since one diode is present in the present embodiment, the combining line of the embodiment of FIG. 7 does not exist. Under the conditions that a frequency is 950 MHz, a small rectangular conductor size is 5 mm square, and a distance between the transmitter and the receiver is 10 cm, with respect to a combination whether a conductor exists in the small rectangular area or not and a combination in which the high-Q capacitor or the high-Q inductor is connected between a pair of the small rectangular conductors adjacent to each other, all the combinations are searched one by one and an appropriate element value of the capacitor and the inductor is obtained by a local optimizing method, whereby this antenna structure is found out. The reactance value obtained by the inductor and the capacitor is between $-j100$ ohms to $+100j$ ohms at the used frequency of 950 MHz.

According to the present embodiment, an example of the antenna structure having the structure of FIG. 7 can be formed by metal, chip capacitors, chip inductors, and chip diodes.

Eighth Embodiment

Figure 9:
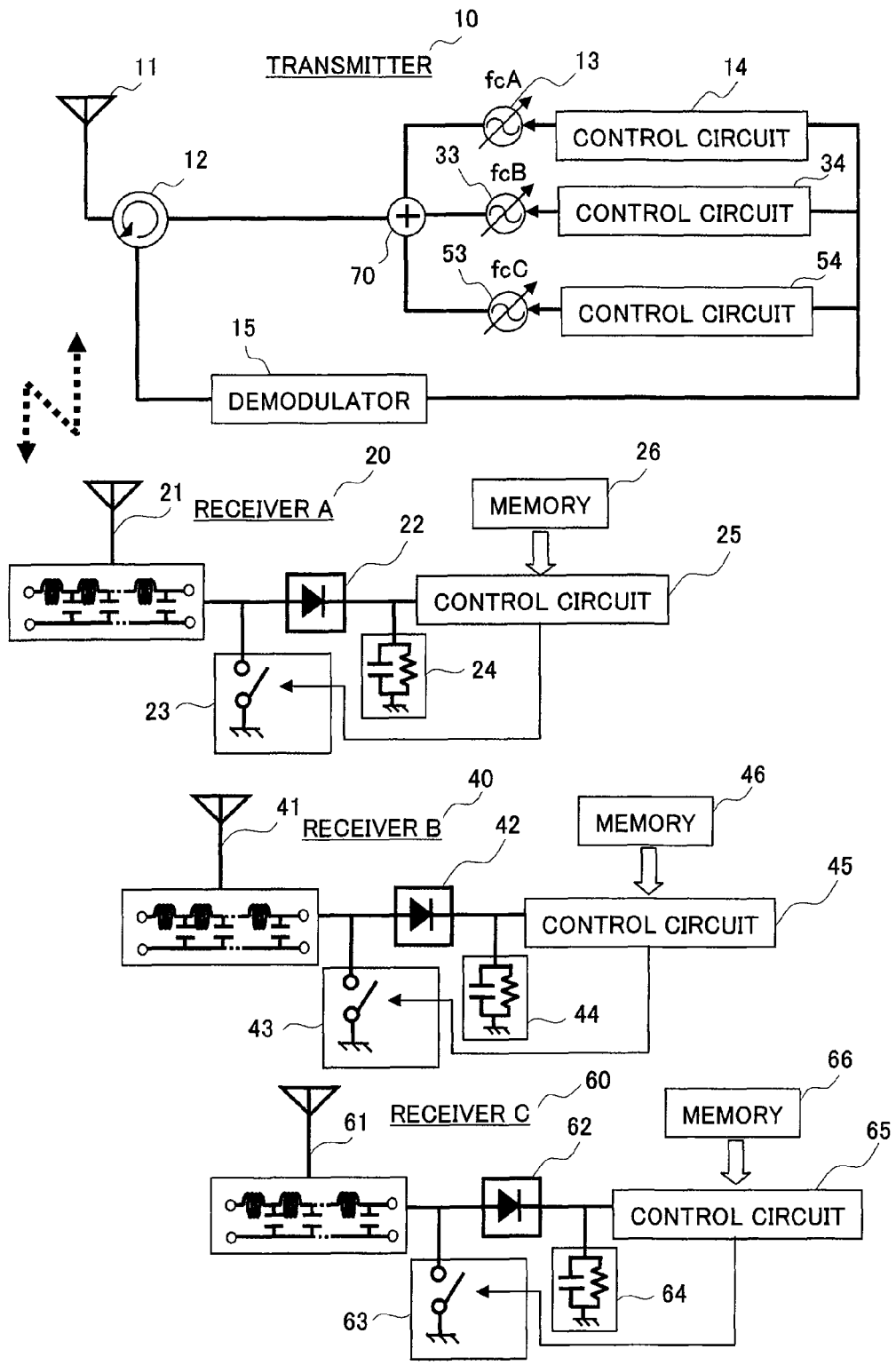
FIG. 9 is a diagram illustrating a third configuration example of the frequency variable power transmitting system in Fresnel region of the present invention.

FIG. 9 is a diagram illustrating a structure of another embodiment of the frequency variable power transmitting system in Fresnel region according to the present invention. The points different from the base station of the embodiment of FIG. 1 are that: a plurality of receivers 20, 40, and 60 exist in the system with respect to one transmitter 10; the transmitter 10 newly has a second frequency variable carrier generator 33, a second control circuit 34, a third frequency variable carrier generator 53, a third control circuit 54, and a combining circuit 70; total three pairs of the frequency variable carrier generators and control circuits are connected to the demodulator 15 in parallel in the same manner as the embodiment of FIG. 1; and outputs of the three frequency variable carrier generators are combined by the combining circuit 70 and supplied to the antenna 11 via the directional coupler 12. The frequency variable carrier generator 13, the frequency variable carrier generator 33, and the frequency variable carrier generator 53 employ different carrier frequencies.

According to the present embodiment, power can be transmitted to a plurality of receivers by one transmitter in high efficiency, and therefore, the number of transmitters per one receiver can be reduced, and as a result, there is an effect of reducing the installation cost of the radio power transmitting system.

Ninth Embodiment

Figure 10A:
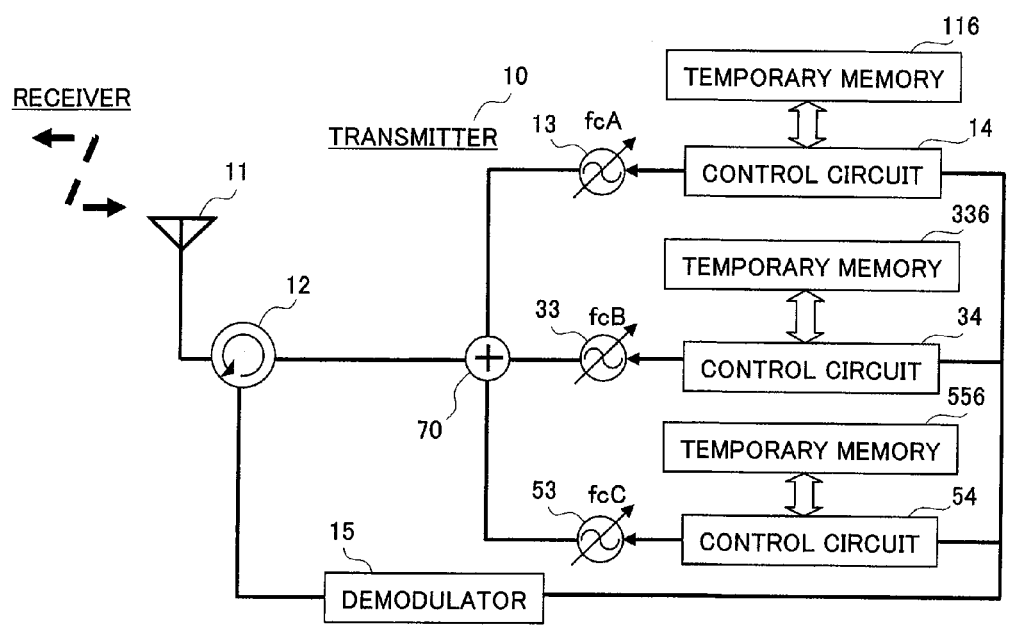
FIG. 10A is a diagram illustrating a fourth configuration example of the base station for the frequency variable power transmitting system in Fresnel region of the present invention.
Figure 10B:
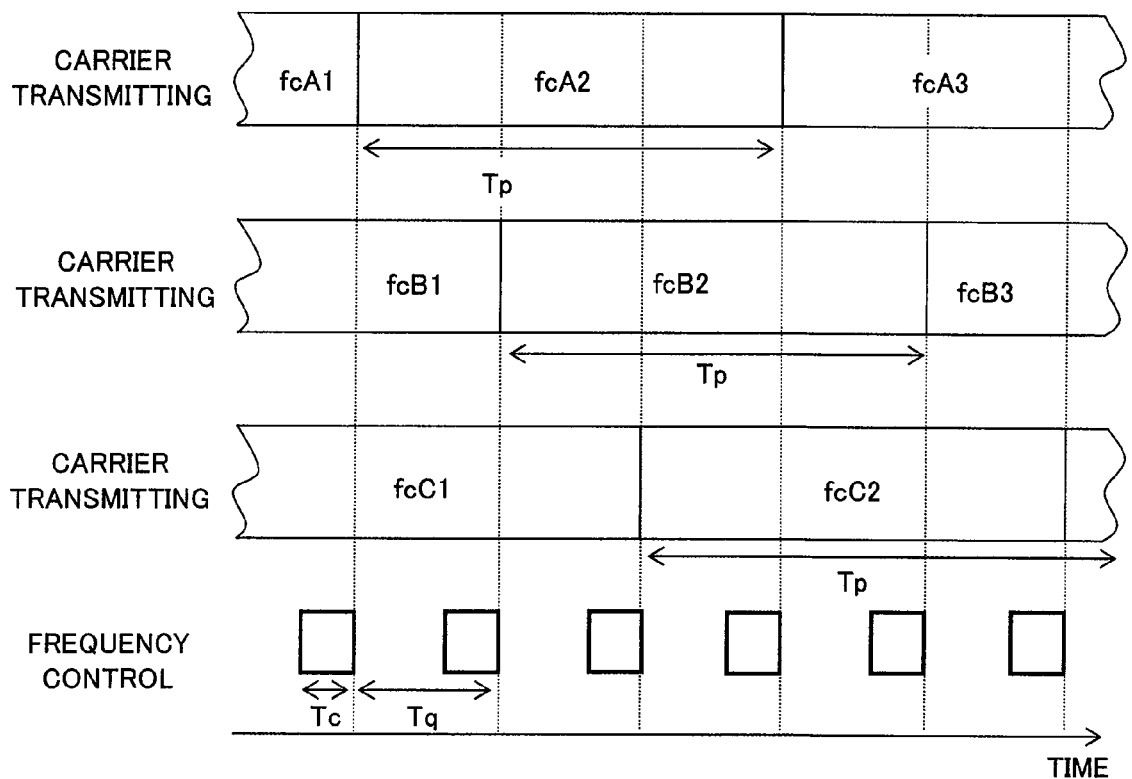
FIG. 10B is a time chart of the configuration of FIG. 10A.

FIGS. 10A and 10B are diagrams illustrating a structure (FIG. 10A) of the transmitter of the frequency variable power transmitting system in Fresnel region of FIG. 9 which is another embodiment of the frequency variable power transmitting system in Fresnel region according to the present invention and a time chart (FIG. 10B) of operations of the control circuits. The points different from the base station of the embodiment of FIG. 1 are that the control circuit 14 has a temporary memory 116, the control circuit 34 has a temporary memory 336, and the control circuit 54 has a temporary memory 556.

The control circuit 14, the control circuit 34, and the control circuit 54 carry out the same controls as the procedure illustrated in the flow chart of FIG. 3 with using the temporary memory 116, the temporary memory 336, and the temporary memory 556. However, since the transmitter 10 has to control the radio power transmission to the plurality of receivers, the procedure of the control as a whole transmitter is different. That is, in order that the transmitter 10 carries out the automatic control of radio power transmission efficiency to the receiver 20, the receiver 40, and the receiver 60, these three types of control are carried out in series on the time axis.

As illustrated in the time chart of FIG. 10B related to the carrier transmission by the frequency variable carrier generator and the frequency control by the control circuits, the transmitter 10 sequentially carries out the procedures related to the frequency control to the receiver 20, the receiver 40, and the receiver 60 within the time Tc in the period Tq and sequentially reflects the results of the procedures about the frequency control on the transmitting frequencies of the frequency variable carrier generator 13, the frequency variable carrier generator 33, and the frequency variable carrier generator 53. As a result, the carrier frequency transmitted by each receiver is maintained at least during the time of Tp, and Tp is equal to three times as long as Tq because three receivers are provided for one transmitter in the present embodiment.

According to the present embodiment, the effect of the embodiment of FIG. 2 can be obtained together with the effect of the embodiment of FIG. 9.

Tenth Embodiment

Figure 11A:
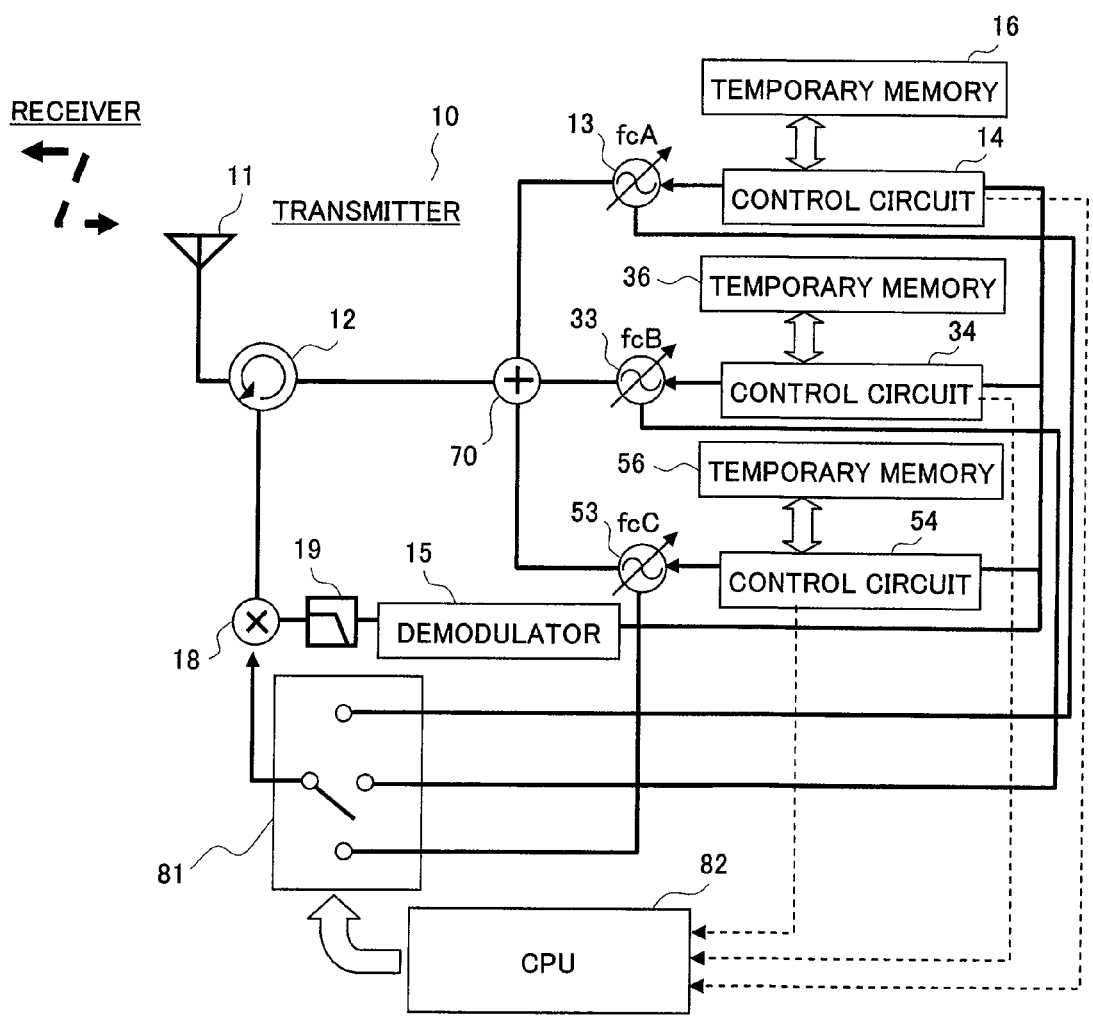
FIG. 11A is a diagram illustrating a fifth configuration example of the base station for the frequency variable power transmitting system in Fresnel region of the present invention.
Figure 11B:
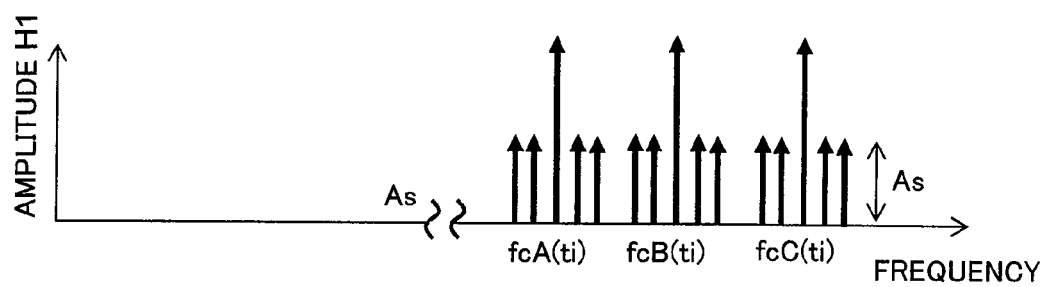
FIG. 11B is a diagram illustrating frequency spectra of the configuration of FIG. 11A and a relation between frequency and amplitude H1.
Figure 11C:
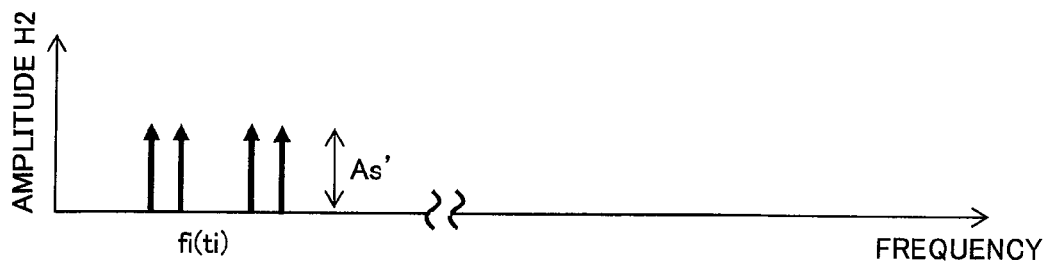
FIG. 11C is a diagram illustrating frequency spectra of the configuration of FIG. 11A and a relation between frequency and amplitude H2.

FIGS. 11A, 11B, and 11C are diagrams illustrating a structure (FIG. 11A) of the transmitter of another embodiment of the frequency variable power transmitting system in Fresnel region according to the present invention and time variations (FIGS. 11B and 11C) of the frequency spectra of the received reflection wave. The point different from the base station of the embodiment of FIG. 10 is that the transmitter 10 has the mixer 18, the filter 19, a switch 81, and a CPU 82, and the mixer 18 is inserted between the directional coupler 12 and the demodulator 15 via the filter 19. The modulated reflection wave from the receiver 2 which is obtained from the antenna 11 via the directional coupler 12 is input to the mixer 18 as an RF signal, and also a part of the output of the frequency variable carrier generator 13, the frequency variable carrier generator 33, or the frequency variable carrier generator 53 via the switch 81 controlled by the CPU 82 is input to the mixer 18 as a signal transmitted from the station. The mixer 18 supplies a low frequency signal having a lower frequency component compared with that of the carrier to the demodulator 15 as a signal of the side band. The signal having a high frequency component generated by the mixer 18 can be removed from the input to the demodulator 15 by using a low pass filter as the filter 19. FIG. 11B and FIG. 11C are diagrams illustrating the frequency spectra of the high frequency input and the low frequency output of the mixer.

According to the present embodiment, since the demodulator 15 does not have to handle the RF signal, a circuit scale of the demodulator 15 can be downsized. Furthermore, since a band width of the signal supplied to the demodulator 15 is constant regardless of the radio power transmission to the receiver 20, the receiver 40, and the receiver 60, an adaptive band width of the demodulator itself can be narrowed, and therefore, there is an effect of simplifying the circuit configuration of the demodulator 15, more particularly, the configuration of the filter. Moreover, since analog/digital converters of conventional techniques can be used in such a low frequency band, demodulation of the demodulator 15 can be carried out by using digital signal processing, and further downsizing of the circuit and improvement of demodulation accuracy can be achieved.

INDUSTRIAL APPLICABILITY

According to the radio power transmitter and receiver operated in Fresnel region and the radio power transmitting system configured by including the same of the present invention, all of the static field, the induction field, and the radiation field generated in the space when the power transmission by electromagnetic waves is carried out are used, and therefore, it is possible to carry out the power transmission of higher efficiency than that of a radio system focusing on a single field which is a conventional technique.

Also, as for the large variation of the transmission efficiency due to the electrical environmental variation in the space including the transmitter and the receiver regarded as a cost of the radio power transmission of high efficiency, the transmitting frequency of the transmitter is set to be variable, and the reactance elements are loaded on the antenna of the receiver to increase the cancel effect of the electrical environmental variation in the space including the receiver with respect to the frequency variation, and further, the power transmission efficiency in the receiver is equivalently monitored by using the radio line itself for carrying out the frequency conversion power transmission, so that the apparatus and transmitting system capable of adaptively and optimally controlling the radio power transmission efficiency with using the transmitting frequency as a control parameter can be achieved.

What is claimed is:

1. A frequency variable power transmitter in Fresnel region used in a frequency variable power transmitting system in Fresnel region having a capacitive element and an inductive element formed in an antenna for transmitting power by electromagnetic wave between a transmitter and a receiver in order to use static field and induction field at the same time in power transmission, setting a transmitting frequency of the transmitter to be variable, and modulating the electromagnetic wave transmitted from the transmitter and reflected by the receiver to control power transmission efficiency between the transmitter and the receiver by using the modulated reflection wave, the frequency variable power transmitter in Fresnel region comprising: the antenna; a frequency variable carrier generator; a directional coupler; a demodulator; and a control circuit, wherein the reflection wave received by the antenna is divided by the directional coupler, and then, the reflection wave is demodulated by the demodulator, and the frequency of the frequency variable carrier generator can be varied by using the demodulated signal.

2. The frequency variable power transmitter in Fresnel region according to claim 1, wherein the transmitter has a modulator and modulates a carrier, and a frequency of the modulation is higher than a frequency of modulation carried out to the reflection wave by the receiver.

3. The frequency variable power transmitter in Fresnel region according to claim 1, wherein the transmitter demodulates the reflection wave from the receiver at a predetermined interval and adaptively controls the carrier frequency of the transmitter.

4. The frequency variable power transmitter in Fresnel region according to claim 3, wherein the transmitter has a modulator and modulates a carrier, and a frequency of the modulation is higher than a frequency of modulation carried out to the reflection wave by the receiver.

5. The frequency variable power transmitter in Fresnel region according to claim 1, wherein the transmitter monitors an amplitude of a side band obtained by demodulating the reflection wave from the receiver and adaptively controls a carrier frequency of the transmitter so that the amplitude becomes maximum.

6. The frequency variable power transmitter in Fresnel region according to claim 5, wherein
the transmitter has a modulator and modulates a carrier, and a frequency of the modulation is higher than a frequency of modulation carried out to the reflection wave by the receiver.

7. The frequency variable power transmitter in Fresnel region according to claim 5, wherein
the transmitter demodulates the reflection wave from the receiver at a predetermined interval and adaptively controls the carrier frequency of the transmitter.

8. The frequency variable power transmitter in Fresnel region according to claim 7, wherein
the transmitter has a modulator and modulates a carrier, and a frequency of the modulation is higher than a frequency of modulation carried out to the reflection wave by the receiver.

9. A frequency variable power receiver in Fresnel region used in a frequency variable power transmitting system in Fresnel region having a capacitive element and an inductive element in an antenna for transmitting power by electromagnetic wave between a transmitter and a receiver in order to use static field and induction field at the same time in power transmission, setting a transmitting frequency of the transmitter to be variable, and modulating the electromagnetic wave transmitted from the transmitter and reflected by the receiver to control power transmission efficiency between the transmitter and the receiver by using the modulated reflection wave,
the frequency variable power receiver in Fresnel region comprising: the antenna; a switching element inserted in parallel to the antenna; a control circuit; a memory; and a rectifying circuit, wherein
the control circuit turns on/off the switching element at a constant timing previously memorized in the memory.

10. The frequency variable power receiver in Fresnel region according to claim 9, wherein
the rectifying circuit having a plurality of smoothing circuits is distributively allocated at a plurality of points on the antenna, and outputs of the plurality of smoothing circuits are combined by a combining line.

11. The frequency variable power receiver in Fresnel region according to claim 10, wherein
the combining line is allocated on a backside of a conductor constituting the antenna.

12. The frequency variable power receiver in Fresnel region according to claim 9, wherein
a plurality of capacitive elements and inductive elements are distributively allocated between a plurality of different two points on the antenna.

13. The frequency variable power receiver in Fresnel region according to claim 12, wherein
the rectifying circuit having a plurality of smoothing circuits is distributively allocated at a plurality of points on the antenna, and outputs of the plurality of smoothing circuits are combined by a combining line.

14. The frequency variable power receiver in Fresnel region according to claim 13, wherein
the combining line is allocated on a backside of a conductor constituting the antenna.

15. A frequency variable power transmitting system in Fresnel region, wherein
a capacitive element and an inductive element are formed in an antenna for transmitting power by electromagnetic wave between a transmitter and a receiver in order to use static field and induction field at the same time in power transmission,
a transmitting frequency of the transmitter is set to be variable, and
the electromagnetic wave transmitted from the transmitter and reflected by the receiver is modulated and power transmission efficiency between the transmitter and the receiver is controlled by using the modulated reflection wave.

16. The frequency variable power transmitting system in Fresnel region according to claim 15, comprising the transmitter and a plurality of the receivers, wherein
the transmitter transmits carriers having a plurality of different frequencies, and the receiver carries out power transmission from the transmitter by using one specific carrier.

17. The frequency variable power transmitting system in Fresnel region according to claim 16, wherein
control of frequency variation related to the carriers having different frequencies is sequentially carried out at different time points on a time axis, and this operation is repeated.

* * * * *